US006895486B2

(12) United States Patent
Wong et al.

(10) Patent No.: US 6,895,486 B2
(45) Date of Patent: May 17, 2005

(54) LINEAR OBJECT MANAGEMENT FOR A RANGE OF FLASH MEMORY

(75) Inventors: Wanmo Wong, Menlo Park, CA (US); Roger Louie, Santa Clara, CA (US); John Sasinowski, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 242 days.

(21) Appl. No.: 10/232,955

(22) Filed: Aug. 29, 2002

(65) Prior Publication Data

US 2004/0044873 A1 Mar. 4, 2004

(51) Int. Cl.[7] .............................................. G06F 12/00
(52) U.S. Cl. ........................ 711/173; 711/153; 711/103
(58) Field of Search ............................... 711/103, 1.47, 711/154, 150, 165, 218; 365/185.01, 185.11, 29, 33; 709/213, 214, 215, 216

(56) References Cited

U.S. PATENT DOCUMENTS

| | | | | |
|---|---|---|---|---|
| 4,580,211 A | * | 4/1986 | Doki et al. ................. | 711/171 |
| 5,394,531 A | | 2/1995 | Smith ......................... | 711/136 |
| 5,778,442 A | | 7/1998 | Ezzat et al. ................. | 711/159 |
| 6,105,115 A | | 8/2000 | Mathews et al. ........... | 711/160 |
| 6,125,424 A | | 9/2000 | Komatsu et al. ............ | 711/103 |
| 6,141,251 A | | 10/2000 | Xing ...................... | 365/185.11 |
| 6,141,731 A | | 10/2000 | Beardsley et al. .......... | 711/136 |
| 6,202,122 B1 | | 3/2001 | Yamada ...................... | 711/103 |
| 6,327,644 B1 | | 12/2001 | Beardsley et al. .......... | 711/136 |
| 6,378,043 B1 | | 4/2002 | Girkar et al. ............... | 711/133 |
| 6,427,186 B1 | | 7/2002 | Lin et al. .................... | 711/103 |
| 6,651,116 B1 | * | 11/2003 | Ludwig et al. ............. | 710/33 |
| 6,732,222 B1 | | 5/2004 | Garritsen et al. ........... | 711/103 |
| 6,735,678 B2 | * | 5/2004 | Noble et al. ................ | 711/165 |
| 2003/0163660 A1 | * | 8/2003 | Lam ........................... | 711/170 |
| 2004/0044836 A1 | | 3/2004 | Wong et al. ................ | 711/103 |
| 2004/0044840 A1 | * | 3/2004 | Wong ......................... | 711/105 |
| 2004/0044858 A1 | | 3/2004 | Wong et al. ................ | 711/156 |
| 2004/0044859 A1 | | 3/2004 | Wong ......................... | 711/156 |
| 2004/0044869 A1 | | 3/2004 | Louie et al. ................ | 711/165 |
| 2004/0044873 A1 | * | 3/2004 | Wong et al. ................ | 711/218 |

OTHER PUBLICATIONS

Int$_e$l ®, "Intel® Flash Data Integrator (FDI) User's Guide", Version 4, Aug. 2001, pp. ii–314.

Bach, Maurice J., "The Design of the Unix® Operating System", Bell Telephone Laboratories, Inc., Prentice–Hall, Inc., Englewood Cliffs, New Jersey, 1986, pp. xi–xiv and 271–311.

Jones, Richard, et al., "Garbage Collection Algorithms for Automatic Dynamic Memory Management", John Wiley & Sons Ltd., Chichester, England, 1996, pp. vii–xxvi and 1–41.

Silberschatz, Abraham et al., "Operating System Concepts, Fifth Edition", Addison Wesley Longman, Inc., 1998, pp. v–xvii and 239–336.

Tanenbaum, Andrew S., "Operating Systems: Design and Implementation", Prentice Hall, Inc., Englewood Cliffs, New Jersey, 1987, pp. vii–xvi and 191–250.

* cited by examiner

*Primary Examiner*—Donald Sparks
*Assistant Examiner*—Brian R. Peugh
(74) *Attorney, Agent, or Firm*—Dorsey & Whitney LLP

(57) ABSTRACT

Data object management for a range of memory. The range of memory has first and second opposite ends. A plurality of data objects are written to a first contiguous region of memory located at the first end of the range of memory. At least one of the valid data objects of the plurality of data objects are copied to a second contiguous region of memory located at the second end of the range of memory when a reclamation process is requested. The valid data objects copied from the first contiguous region of memory are marked as invalid data in the first contiguous region of memory subsequent to the valid data objects being copied to the second end of the range of memory, and the memory in which invalid data objects in the first contiguous region of memory are located is erased.

80 Claims, 8 Drawing Sheets

Fig. 2

| NUMBER | STATE | BINARY VALUE | POWER LOSS RECOVERY ACTION | NEXT STATE | ACTION FOR NEXT STATE |
|---|---|---|---|---|---|
| 001 | EMPTY | 1111 1111 | NONE | WRITING_HDR_LEN | WRITE STATE AND LENGTH |
| 002 | WRITING_HDR_LEN | 1111 1110 | SKIP HEADER STATE AND LENGTH FIELDS | WRITING_HDR | WRITE STATE AND HEADER RECORD |
| 003 | WRITING_HDR | 1111 1100 | SKIP HEADER | WRITTEN_HDR | WRITE STATE |
| 004 | WRITTEN_HDR | 1111 1000 | SKIP HEADER AND DATA | WRITING_DATA | WRITE STATE AND DATA |
| 005 | WRITING_DATA | 1111 0000 | SKIP HEADER AND DATA | WRITTEN_DATA | WRITE STATE WHEN FINISH WRITING DATA |
| 006 | WRITTEN_DATA | 1110 0000 | CHANGE STATE TO VALID_DATA | VALID_DATA | WRITE STATE |
| 007 | VALID_DATA | 1100 0000 | NONE | INVALID_DATA | WRITE STATE |
| 008 | INVALID_DATA | 1000 0000 | SKIP HEADER AND DATA | ERASE_PARTIAL | ERASE DATA OUTSIDE THE FLASH BLOCK AND WRITE STATE |
| | | | | EMPTY | ERASE FLASH BLOCK |
| 009 | ERASE_PARTIAL | 0000 0000 | SKIP HEADER AND DATA UP TO FLASH BLOCK | EMPTY | ERASE FLASH BLOCK |

LINEAR OBJECT MANAGEMENT FOR A RANGE OF FLASH MEMORY

TECHNICAL FIELD

The present invention is related generally to the field of data object management, and more particularly, to data object management in semiconductor memory devices, such as flash memory devices.

BACKGROUND OF THE INVENTION

Non-volatile memory is a type of memory that can retain data and information even when power is not applied. An example of non-volatile memory that is being used in a variety of applications, such as cellular phone technology, is "flash memory." Flash memory is a form of electrically erasable programmable read-only memory (EEPROM), where data can be written in bytes and erased in blocks of memory. The blocks of memory typically range from 8 kbytes to 1 MByte in size. The cell density of flash memory devices can be very high, often as high as conventional dynamic random access memory (DRAM) cells, since in conventional flash memory a single floating gate structure is used for each memory cell. Flash memory devices also have relatively fast data access times. In the past, flash memory has been used in applications such as storing basic input/output system (BIOS) information in personal computers. However, with improvements in programming capabilities, and the continually increasing demand for persistent and low-power memory devices, the application of flash memory in many other areas has expanded very rapidly.

As previously mentioned, one such application is in cellular phones. At one time, cellular phones were only limited to voice communication. Now, cellular phones provide Internet access and web browsing capabilities, allow a user to capture and store computer graphic images, capture and playback video images, and provide personal digital assistant (PDA) capabilities. As a consequence, cellular phones need to be able to store different types of data and information. For example, whereas older cellular phones would only need to store data representing phone numbers, newer cellular phones need to store phone numbers, voice information, computer graphic images, small applications (e.g., Java applets) downloaded from the Internet, and the like.

The various data objects that must be stored by the flash memory have different characteristics. For example, data such as phone numbers are generally small segments of data having uniform length. Other data can be variable in length, such as voice information, where the amount of memory used depends on the length of voice information recorded. Data can be packetized, as in the case where data is downloaded from the Internet. Additionally, the amount of memory consumed by data such as voice information and image files can be considerable, spanning multiple blocks of flash memory. Application code, such as a Java applet, is unique in that the binary code must be stored contiguously in flash memory to allow for the code to be executed by a processor directly from the flash memory.

Flash memory, which is non-volatile and has low operating power, is perfectly suited for data and information storage applications such as in cellular phones where conservation of power is very desirable. However, the operating characteristics of flash memory must be adapted to facilitate storage of the different types of data and information previously described.

Flash memory, although providing many of the characteristics required for applications in portable and remote (wireless) devices, has unique operational characteristics that need to be considered. For example, because of the floating gate structure of conventional flash memory cells, data cannot be simply overwritten. The memory cells must be erased prior to writing new data. Also, as previously mentioned, flash memory devices are designed to erase data in blocks of memory cells, rather than on a cell-by-cell basis. Thus, although only a portion of the memory cells of a block need to be updated, the entire block must first be erased before programming the new data. The process of erasing an entire block of memory cells and programming new data takes a relatively long time to complete, and deferring an erase operation is often desirable. Additionally, erasing the entire block is a problem, however, in the case where another portion of the memory cells of the block do not need to be updated. Another issue related to flash, and other floating gate memory devices, is that these memory cells have a limited life-cycle where repeated cycles of erasing and programming degrade memory cell performance. Eventually, the cell performance is degraded to such a degree that the memory cell can no longer be used to store data.

In an effort to facilitate the use of flash products in applications such as cellular phones, memory management software interfaces have been developed to make the management of data storage in flash devices transparent to the user. The memory management software carries out various operations in the flash memory such as managing code, data and files, reclaiming memory when insufficient erased memory is available for programming new data, and wear-leveling flash blocks to increase cycling endurance. Memory management typically includes functions to support storage of parameter data for EEPROM replacement, data streams for voice recordings and multimedia, Java applets and native code for direct execution, and packetized data downloads. In addition to these operations, the memory management software often ensures that in the event of a power loss, previously programmed data is not lost or corrupted. An example of this type of memory management software is Intel® Flash Data Integrator (FDI) software.

Although conventional flash memory management software has succeeded in increasing the flexibility of flash memory, there is still room for additional improvement. Conventional memory management software has limitations in the area of data management. For example, in some conventional flash memory management software, the memory space of a flash device is partitioned into fixed memory address ranges and either code or data is associated with each of the ranges. Once set at compile time, the range and the type of associated data cannot be changed without recompilation. Consequently, if at a later time a different partitioning between code and data is desired, the ranges defined for the two types of data cannot be modified unless software is recompiled. Additionally, although different flash memory management software performs many of the same functions, the process by which the functions are performed can be very different, with some being more efficient or providing a greater level of data integrity than others. For example, where information regarding the mapping of data within a memory is maintained in a single table corresponding to one physical block of flash memory, corruption of the single table, such as in the event of a power failure during a write operation to the table, will leave the flash memory device in a questionable state. Another example is using only a single physical block of flash memory to aid in the reclamation process, which may result in an inefficient iterative write and erase when the data objects stored in memory are large and which may corrupt the data objects if interrupted by a power loss. Therefore, there is a need for alternative memory management processes that can be implemented for flash memory devices.

SUMMARY OF THE INVENTION

The present invention is directed to management of data objects in a range of memory. The range of memory has a first end and a second opposite end. A plurality of data objects are written to a first contiguous region of memory located at the first end of the range of memory. At least one of the valid data objects of the plurality of data objects is copied to a second contiguous region of memory located at the second end of the range of memory. The valid data objects copied from the first contiguous region of memory are invalidated subsequent to the valid data objects being copied to the second end of the range of memory, and invalid data objects are erased from the first list.

In another aspect of the invention, data objects are managed in a memory space by allocating memory contiguously beginning from a first end of a range of memory for writing a plurality of data objects to the range of memory, copying from the first end of the range of memory at least one of the valid data objects to a second end of the range of memory. Contiguous memory is allocated beginning from the second end and extending toward the first end. After a valid data object is copied to the second end, the valid data object is invalidated in the data objects of the first end and the memory in which invalid data objects are located is erased to reclaim the memory when desired.

DETAILED DESCRIPTION OF THE INVENTION

Embodiments of the present invention are directed to memory management processes and structures for managing data and code objects in a range of flash memory. In the following detailed description of exemplary embodiments of the invention, reference is made to the accompanying drawings, which form a part hereof, and in which are shown, by way of illustration, specific exemplary embodiments in which the invention may be practiced. These embodiments are described in sufficient detail to enable those skilled in the art to practice the invention. However, it will be clear to one skilled in the art that the invention may be practiced without these particular details. Other embodiments may be utilized and modifications may be made without departing from the spirit or scope of the present invention. The following detailed description is, therefore, not to be taken in a limiting sense, and the scope of the present invention is defined only by the appended claims.

Figure 1:
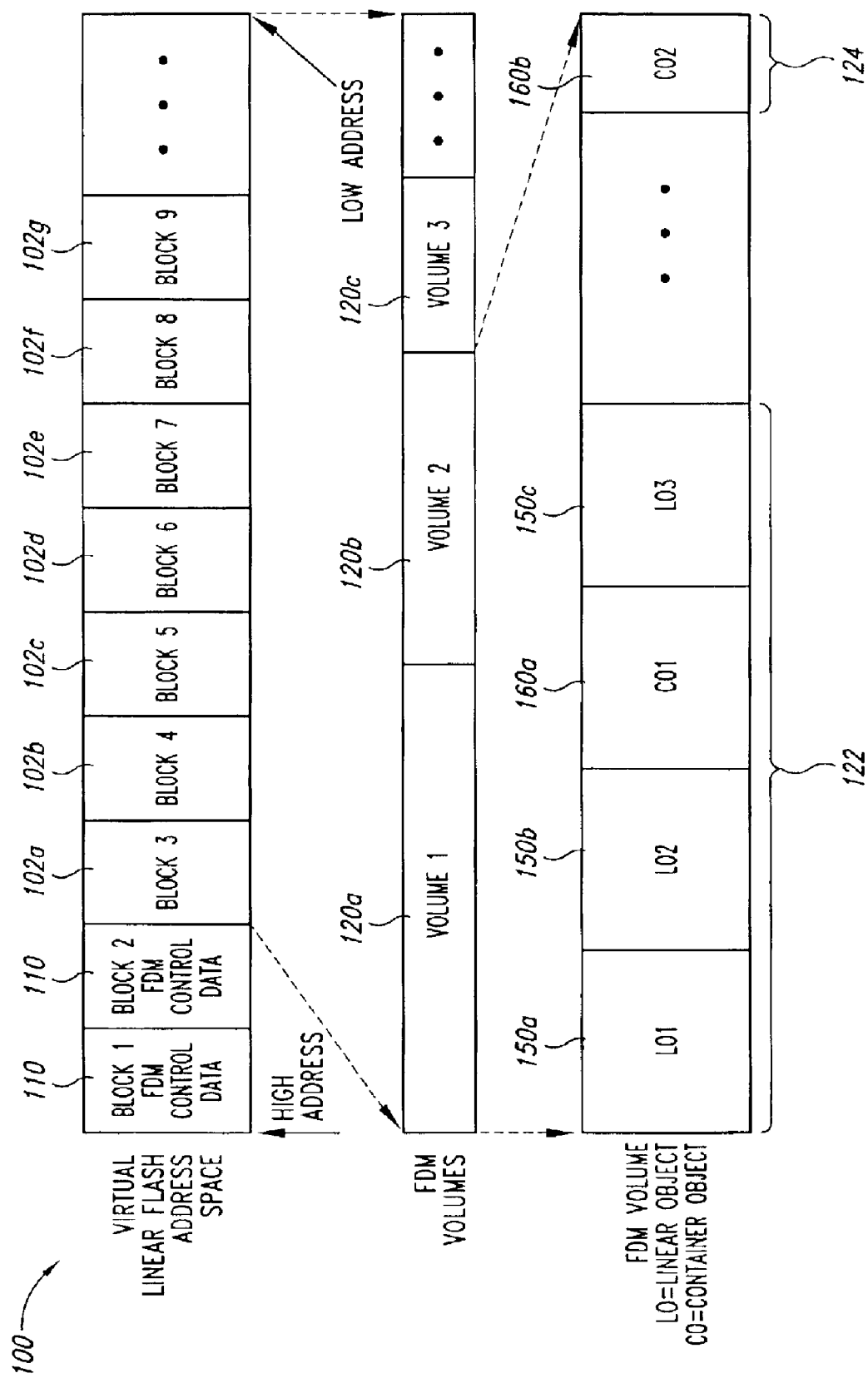
FIG. 1 is a drawing of a data architecture according to an embodiment of the present invention.

FIG. 1 shows a data architecture 100 in which embodiments of the present invention can be employed. The data architecture 100 can be used by a flash data manager (FDM) process to handle data objects in a flash memory device. The data architecture 100 associates volumes 120 to the physical flash memory blocks 102 of one or more flash memory devices. Generally, the volumes 120 can be variable in size, and may be modified by a user subsequent to compile time of the user's application. As a result, the boundaries of a volume 120 can be adjusted during run time of an application. The volumes 120 can also span multiple flash memory blocks 102 and have boundaries that do not need to correspond to flash memory block boundaries. However, in this case, additional overhead may be necessary to process the partial flash memory blocks during erasing and writing operations. A more detailed description of the volumes 120 and management thereof is provided in commonly assigned, co-pending U.S. application Ser. Nos. 10/232,952, entitled DYNAMIC VOLUME MANAGEMENT, to Wong, filed Aug. 29, 2002, and 10/233,324, entitled LINEAR AND NON-LINEAR OBJECT MANAGEMENT, to Wong, filed Aug. 29, 2002, which are incorporated herein by reference.

Each of the volumes 120 has a contiguous range of memory that is defined by data written in FDM control blocks 110. In an embodiment of the present invention, two FDM control blocks 110 are used to store volume definition information. In this manner, one of the FDM control blocks 110 can be kept in an erased state while the other FDM control block 110 contains current volume definition information. Updating volume definition information requires new data to be written in the FDM control block. After the volume definition information is updated often enough, resulting in the volume definition information exceeding the available memory of one FDM control block 110, only the valid volume definition information is copied from the present FDM control block 110 to the FDM control block 110 in the erased state to allow for the memory of the other FDM control block to be reclaimed. The process of alternating between the two FDM control blocks allows volume definition information to be updated an unlimited number of times while ensuring that valid volume definition is available even in the event of a power loss.

The contiguous range of memory spans a sequential range of memory addresses that begin with a starting address and terminates with an ending address. An example of the type of data included in the FDM control blocks 110 is the starting block number and block count over which the volume 120 spans. It will be appreciated by one of ordinary skill in the art, however, that the particular data defining the volume 120 and the particular location where the data is stored can be modified without departing from the scope of the present invention. Within the range of memory space, data objects can be stored. The memory space of a volume 120 is managed such that enough free memory space is reserved to contain a copy of the largest data object stored in the volume 120, plus one or two physical flash memory blocks 102. Each data object stored by the volume 120 is categorized as either a linear object 150 or a container object 160. A linear object 150 is generally used to store data in linear or sequentially addressed fashion, such as application code. The container objects 160, on the other hand, are used to store non-linear data in a "linear" fashion. As a result, linear objects 150 and non-linear objects, in the form of container objects 160, can be stored anywhere within the available memory space of a volume 120, and partitioning the memory space of a flash memory into two regions, one region specifically for linear data and another region specifically for non-linear data, is not necessary. Consequently, in embodiments of the present invention, the memory space of the flash memory device can be utilized in an open manner, storing data objects in the available memory space independent of the particular type of data, rather than accommodating a fixed partitioned memory space where the location at which data is stored in memory is governed by the particular data type (i.e., either linear or non-linear).

A more detailed description of the volumes 120, and object management thereof, is provided in commonly assigned, co-pending U.S. application Ser. No. 10/232,952, entitled DYNAMIC VOLUME MANAGEMENT, to Wong, filed Aug. 29, 2002, which is incorporated herein by reference. A more detailed description of data object management is provided in commonly assigned, co-pending U.S. application Ser. No. 10/232,841, entitled SYSTEM AND METHOD FOR LINEAR OBJECT REALLOCATION IN PLACE, to Louie et al., filed Aug. 29, 2002, which is incorporated herein by reference. Additionally, a more detailed description of the container objects 160, and object management thereof, is provided in commonly assigned, co-pending U.S. application Ser. No. 10/232,840, entitled SINGLE SEGMENT DATA OBJECT MANAGEMENT, to Wong et al., filed Aug. 29, 2002, and U.S. application Ser. No. 10/232,822, entitled MULTIPLE SEGMENT DATA OBJECT MANAGEMENT, to Wong et al., filed Aug. 29. 2002, which are both incorporated herein by reference.

The linear objects 150 and container objects 160 are stored in the volume 120 in two lists that are associated with a respective end of the contiguous range of memory. A list can be generally defined as a collection of data objects stored contiguously. A "top list" starts from a high memory address location and extends toward descending memory addresses of range of memory as data objects are added to the end of the top list. In FIG. 1, data objects 150*a*, 150*b*, 160*a*, and 150*c* represent a top list 122 of the volume 120*a*. Conversely, a "bottom list" starts from a low memory address location and extends toward ascending memory addresses of the range of memory as data objects are added to the end of the bottom list. The data object 160*b* represents a bottom list 124 of the volume 120*a*. By having the "top" and "bottom" lists 122, 124 for each volume 120, a dual list arrangement is created. Each of the data objects within the volume 120 are cataloged in one of these lists.

As will be described in greater detail below, the linear object 150 and the container object 160 have headers that include information related to the respective data object, and are used to implicitly link together the linear data and container objects 150, 160 to form the two lists. Further included in the headers of the linear object 150 and the container object 160 is a state field that contains data representing an object state of the respective data object. As the object state of a data object changes over time, the FDM updates the state field of the respective data object as the data transitions from one state to another. Thus, the latest object state of a data object can be determined by the value contained in the state field.

Figure 2:
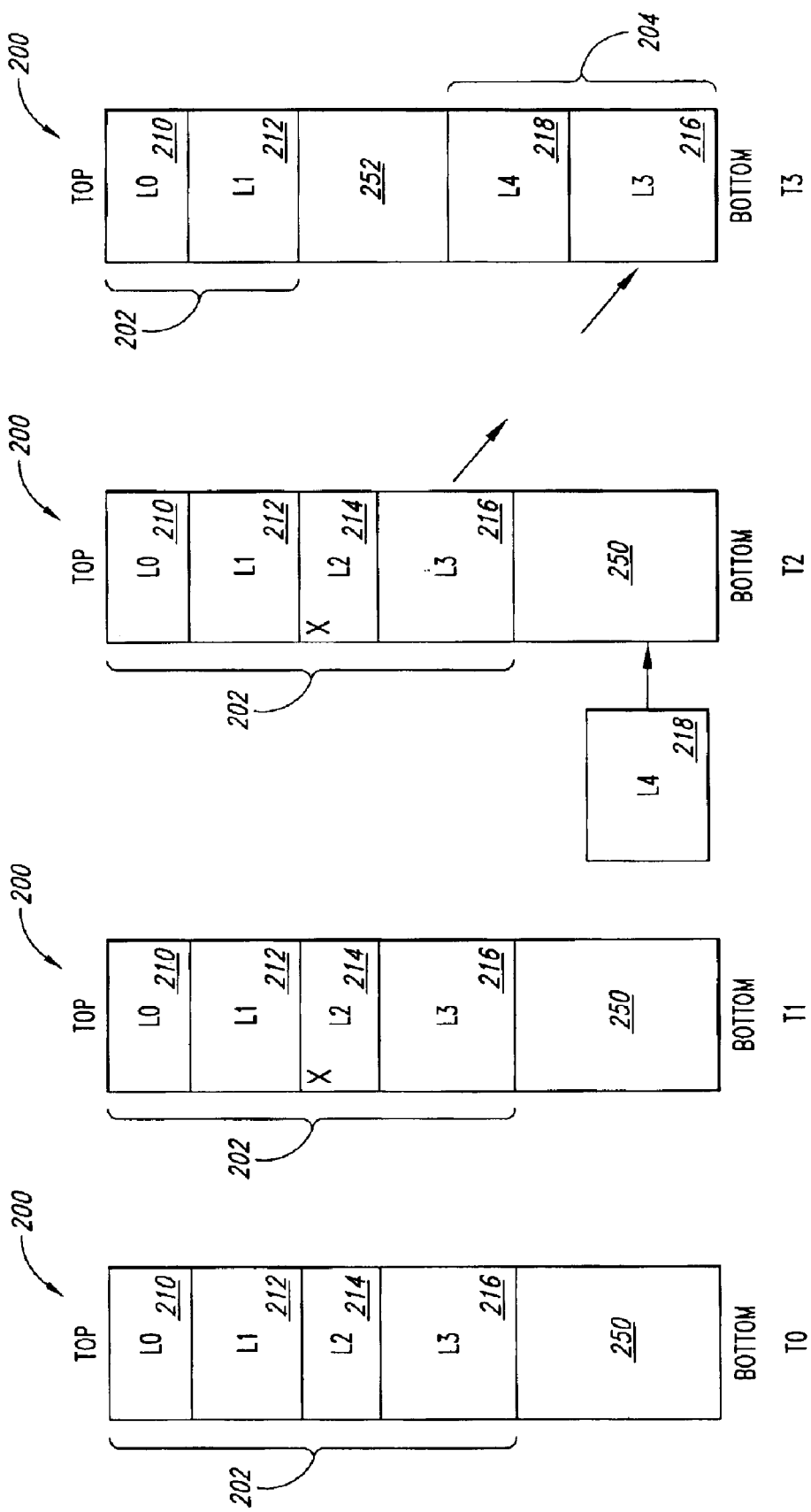
FIG. 2 is a table showing object states for data objects according to an embodiment of the present invention.

FIG. 2 shows a table of object states that can be employed in the headers of the linear objects 150 and the container objects 160. In summary, the "EMPTY" state indicates free erased memory space available for writing. The "WRITING_HDR_LEN" state indicates that a header length is being written. The "WRITING_HDR" state indicates that the data object header is in the process of being written, such as writing the object state, but there is currently no data stored. The "WRITTEN_HDR" state indicates that the header is complete. The "WRITING_DATA" state indicates that data is being written and the data size is known. The "WRITTEN_DATA" state indicates that data has been written but not yet marked as valid. The WRITTEN_DATA state distinguishes between a copy of an object and the original object during the data copying process, in the event power loss occurs during a reclamation process. The WRITTEN_DATA state also distinguishes the completed state of the object during the creation of the object for the first time in the event of power loss recovery. The VALID_DATA state indicates that the stored data is valid. The INVALID_DATA state indicates that the data is freed and, as will be explained in more detail below, is eligible for reclamation. As shown in the table of FIG. 2, the INVALID_DATA state can transition into an ERASE_PARTIAL or EMPTY state depending on whether the ERASE_PARTIAL state is applicable. The "ERASE_PARTIAL" state indicates that the data beyond the boundary of a flash block is erased. This state can only exist in objects at the end of a list. As will be explained in more detail below, the granularity of the object states facilitates a power loss recovery process that can be used to recover data in the event of power loss and ensure uncorrupted data can be located.

As shown in the table of FIG. 2, the object state of a data object can be represented by a binary value. Each state change clears a single bit of the binary value. As the object state of a data object changes over time, the FDM updates the state field of the respective data object to reflect data transitions from one object state to another by programming the value corresponding to the new object state. As the object state of a data object transitions, for example, from an EMPTY state to a WRITING_HDR_LEN state, and where the least significant bit (LSB) corresponds to the WRITING_HDR_LEN state, the state field will change from 1111 1111 to 1111 1110. As known by those of ordinary skill in the art, in the case of NOR flash memory devices, an unprogrammed (i.e., erased) memory cell of flash memory is represented by a value of "1" and a programmed memory cell is represented by a value of "0" (in contrast to NAND flash memory devices, where the process is inverted). Consequently, in updating the object state from EMPTY to WRITING_HDR_LEN, the value 1111 1110 can be written directly to the state field without the need for erasing any cells because only the LSB needs to be programmed to indicate a change in object state. The other bits remain unprogrammed. As the object state transitions, each succeeding bit gets programmed to reflect the change in object states. For example, if the second to the LSB corresponds to a WRITING_HDR state, then the state field is modified from 1111 1110 to 1111 1100 when the state of the data object transitions from the WRITING_HDR_LEN state after the header record and state have been written. It will be appreciated that the previous example was provided for the purpose of illustration, and the correspondence of bits to states can be modified without departing from the scope of the present invention. Consequently, the foregoing example is not intended to limit the scope of the present invention to any particular embodiment.

Various processes of the FDM use the information in the data object headers of the linear objects 150 and the container objects 160 in handling the data objects. For example, a power loss recovery process uses the information in the headers for data recovery in the event of a power failure. When a power recovery process is performed, the saved data can be restored by examining the state field in each header block and the associated data object. That is, the power loss recovery process can make the determination on how to take action based on the object state of the data object. For example, assuming that the object states shown in FIG. 2 are being used, only when the data object has an EMPTY or VALID_DATA state will no action be taken during the power loss recovery process. For all other object states, it is assumed that parts of the data object are unreliable and are ignored by skipping past the appropriate portions of memory. The power loss recovery process will transition the information in the state field of the new data objects having a WRITTEN_DATA state to a VALID_DATA state, and any corresponding copies of the data objects having a VALID_DATA state to an INVALID_DATA state. In this manner, uncorrupted data can be guaranteed in the event flash operation is interrupted by power loss. Thus, in the worst case, a power failure during the updating of a data object results in the loss of the new data. The old data remains valid and can be recovered.

A reclamation process according to an embodiment of the present invention also uses the information of the state field to determine which blocks of memory of the volume 120 can be erased to reclaim memory when there is insufficient free memory space to allocate a data object. An object can be discarded by the reclamation process when the state of the data object is in the WRITING_HDR_LEN, WRITING_HDR, WRITTEN_HDR, WRITING_DATA, INVALID_DATA, and ERASE_PARTIAL object states. In an embodiment of the present invention, the reclamation process is invoked by the FDM when more memory space is required to allocate a data object to the volume 120. When a linear object 150 is relocated, the FDM notifies an executing application that the data object will be moved. The application may also be allowed to provide new contents for the data object. Upon completion of the relocation, the FDM performs a second callback to inform the application that references to data in the old data object location are no longer valid, and that the data in the new location is correct. Unless a subsequent indication is provided that the data object has finished moving, interrupts must be suspended until the data object is valid in its new location to ensure data integrity, since the application can reference the contents of a data object at any time. As will be explained in more detail below, when a container object 160 is relocated, only the valid multi-segment and single-segment data objects are copied to the new container's location.

The reclamation operation takes advantage of the dual list arrangement of embodiments of the present invention by selecting the direction for allocating from one list and reclaiming from the other list, and reversing the direction when all data objects in the second list have been reclaimed. As a result, the data movement of the reclamation process provides the benefit of wear leveling by distributing the programming and erasing operations evenly across the flash memory device.

Memory space is allocated in either a "bottom-to-top" direction or "top-to-bottom" direction. When the allocation direction is bottom-to-top, new data objects are written at the end of the bottom list which grows from the bottom of the volume 120. When the allocation direction is top-to-bottom, the reverse is true, that is, data objects are written from the end of the top list which grows from the top of the volume 120. During reclamation, objects are processed in order from the end of one list, and valid data objects are copied to the end of the opposite list. For a bottom-to-top allocation, the reclamation process reclaims memory space from the end of the top list up to the top of the memory space of the volume 120, and for a top-to-bottom allocation, memory space is reclaimed from the top of the bottom list. Data objects that are no longer valid are simply erased when the memory block 102 is erased. The net effect is that all of the valid data objects are incrementally compacted to one end of the volume 120, and all of the invalid data objects are erased. The resulting free memory pool of the volume 120 is thus one contiguous region of memory between the two lists of the volume 120.

In contrast, reserving a single block of flash for relocating objects can be problematic when the data objects stored in the volume are large. When the volume is close to being full, there may not be sufficient free space to store both the original object and its new copy at the same time. Moving the object then requires moving part of it, erasing some flash, and repeating until the copy is complete. However, during this time there are a couple of problems. First, applications cannot access the original copy because it is no longer intact, thus, delaying the applications. Second, a power failure will leave the data object split in two disjoint pieces. The second concern can be dealt with in most cases by providing the means for the power loss recovery to resume the copy. However, in the case where an application provides new data for an object during a move, the object will become scrambled during a power loss. There is no way to safely unite the portions of the object containing the new data with the old portions of the object since the remaining new data was likely stored in volatile memory and is no longer available. Additionally, using a single block of flash for relocating data objects has the further disadvantage of subjecting the cells of that block to repetitive cycles of write-and-erase to a greater extent than other flash blocks, creating a situation where the flash memory is worn unevenly.

Figure 3:
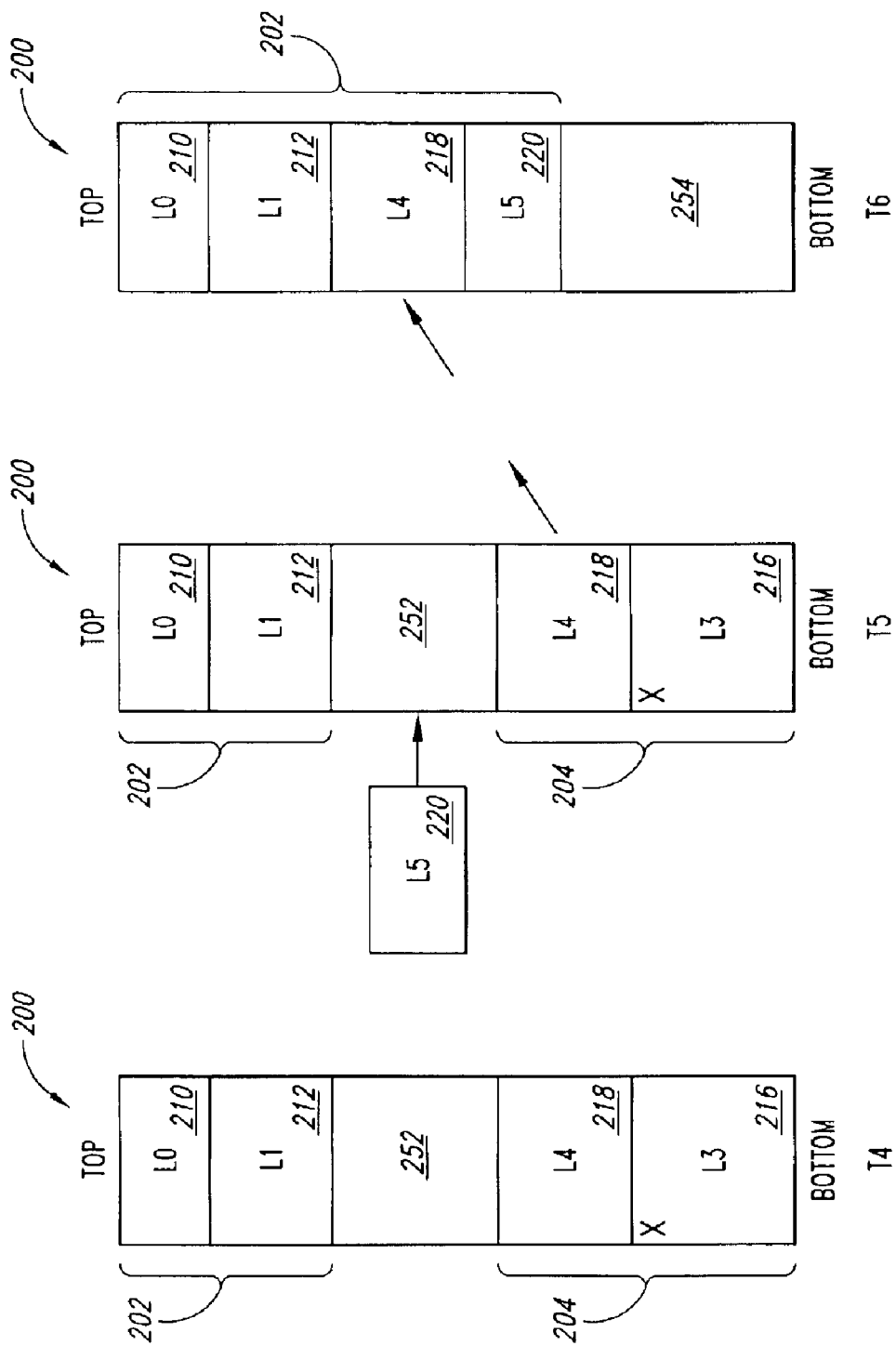
FIGS. 3A–G are drawings of a memory reclamation process flow according to an embodiment of the present invention.

An example of the reclamation operation is illustrated in FIG. 3. As shown in FIG. 3A, the memory space of a volume 200 has been allocated in a top-to-bottom direction, resulting in data objects 210, 212, 214, 216 being stored contiguously in the memory space of the volume 200 at time T0 to form a top list 202. Free space 250 between the end of the data object 216 and the bottom of the memory space is available for writing data. The data objects 210, 212, 214, 216, each have a header that includes a state field containing data representing the object state of the respective data object. At time T0, all of the data objects 210, 212, 214, 216 are in the VALID_DATA state, indicating that the data should not be erased. Additionally, the headers of data objects 210, 212, 214, 216 have a size field containing data that represents a link which is used for calculating the location of the next data object in the list. In this manner, the data objects 210, 212, 214, 216 are implicitly linked together to form the list. The end of the list is determined by reading a state field having an EMPTY object state.

At a later time T1, the object state of the data object 214 is changed from a VALID_DATA to INVALID_DATA, as indicated by the "X" in FIG. 3B. Since the data object is INVALID_DATA, it can now be erased. An example of when this occurs is when the data is no longer wanted by the user, or is no longer needed by the FDM. At a time T2, as illustrated in FIG. 3C, an allocate operation is requested to allocate memory for writing data object 218 to the volume 200. However, the free space 250 is insufficient for the data object 218 to be written to the volume 200 without performing a reclamation operation. As previously discussed, enough memory space is reserved in the volume 200 to contain a copy of the largest data object stored in the volume, plus one or two flash blocks. Consequently, since the memory space of the volume 200 has been allocated in a top-to-bottom direction, the FDM invokes a bottom-to-top reclamation operation to be performed at time T3. That is, the memory space of the volume 200 will now be allocated in a bottom-to-top direction, with the data objects copied to the bottom of the memory space. As shown in FIG. 3D, starting from the end of the top list 202, the data object 216 is copied to the bottom of the memory space of the volume 200 in the free space 250 to begin a bottom list 204 of the volume 200. After completion of the copy process, the state field for the header of the old copy of the data object 216 is updated to INVALID_DATA, thus allowing the memory blocks to be reclaimed. The memory space occupied by the data object 214, which was changed to INVALID_DATA at time T1, is reclaimed as well. As a result of copying the data object 216 to the bottom list 204, and reclaiming the memory previously occupied by the old copy of the data object 216 and the invalidated data object 214, a free pool of memory large enough to accommodate the allocate request for the data object 218 is created between the end of the top list 202 (i.e., data objects 210 and 212) and the end of the bottom list 204 (i.e., data object 216). The resulting new free space 252 following the reclamation process at time T2 is the sum of the old free space 250 and the space reclaimed from erasing the data object 214. As shown in FIG. 3D, the data object 218 is written into the free space 252 at the end of the bottom list 204 (i.e., end of data object 216) and associated with the bottom list 204.

At a time T4, the object state of the data object 216 is changed from a VALID_DATA to INVALID_DATA, as indicated by the "X" in FIG. 3E, indicating that the data of the data object 216 is no longer needed and can be erased. At a time T5, an allocate operation is requested to allocate memory for writing data object 220 to the volume 200 as shown in FIG. 3F. Before the data object 220 can be written to the volume 200, however, a reclamation operation will need to be performed to make sufficient memory space available for the allocate operation because the free memory pool 252 cannot satisfy the condition that there must be sufficient memory space in the volume 200 to contain a copy of the largest data object, plus one or two flash blocks. Consequently, since the last reclamation process at time T3 allocated memory in a bottom-to-top direction, at T6 the FDM invokes a top-to-bottom reclamation process to be performed. Starting from the end of the bottom list 204, the data object 218 is copied into the free space 252 to the end of the top list 202, which is represented by the end of the data objects 212, the state field of the old copy of the data object 218 is updated to INVALID_DATA, and the memory space it previously occupied is reclaimed. The memory occupied by the invalidated data object 216 is also reclaimed. The resulting free space 254 is the sum of the free memory space 252 and the memory space reclaimed from the data object 216, which is now sufficiently large to accommodate the allocate request of the data object 220. As shown in FIG. 3G, the data object 220 is now written to the end of the top list 202 against the data object 218.

In the present example, the time at which the reclamation process is performed is based on whether there is sufficient memory available to perform an allocate operation. However, it will be appreciated by those of ordinary skill in the art that the memory reclamation process can be invoked by the FDM at other times as well without departing from the scope of the present invention. For example, the reclamation process can be performed based on the level of fragmentation of valid blocks of data objects in the memory space of the memory. Alternatively, the reclamation process can be performed when the ratio of data objects having VALID_DATA to erasable data objects exceeds a predetermined value indicative of imminent memory space issues. In another embodiment, the reclamation process can be performed substantially periodically, or upon an event, such as power-up or power-down. In another embodiment, a developer can instruct the FDM to initiate a reclamation process and specify whether to perform a top-to-bottom or bottom-to-top process. Therefore, the particular embodiment of the foregoing example should not be used to limit the scope of the present invention.

It will be further appreciated that the use of the terms "top" and "bottom" lists have been used to aid in the understanding of embodiments of the invention. The particular association of a list with particular memory addresses in the previous description has been provided by way of example. The previous description is not intended to limit the present invention to a particular arrangement of top and bottom lists to high and low memory addresses. More generally, in embodiments of the present invention, first and second lists of data objects are associated with first and second ends of a volume.

Figure 4:
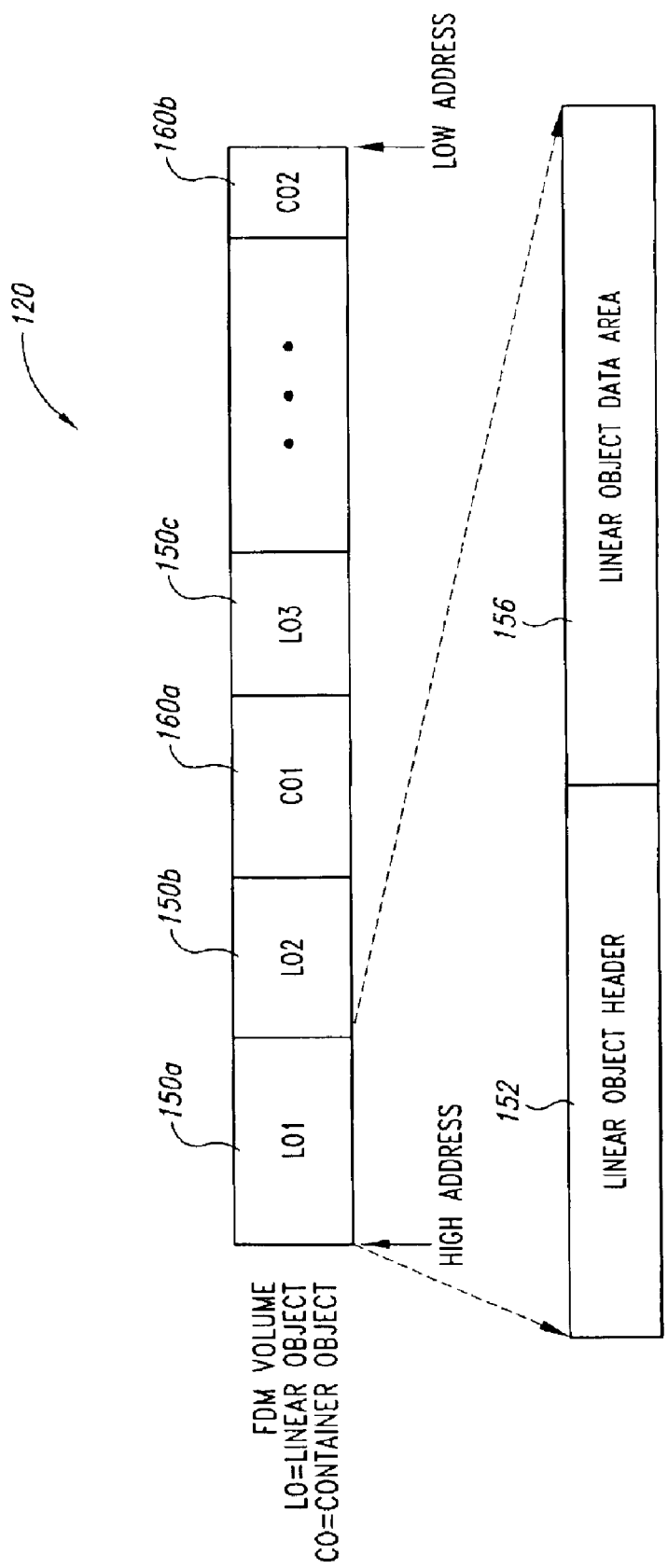
FIG. 4 is a drawing of a linear object according to an embodiment of the present invention.

As previously described, in an embodiment of the present invention, the data objects of the volume 120 are categorized into linear objects 150 and container objects 160. FIG. 4 shows a linear object 150 according to an embodiment of the present invention. The linear object 150 includes a linear object header 152 and a linear object data area 156. The linear object header includes various fields containing information related to the particular linear object 150. As previously discussed, one field included in the linear object header 152 is a state field that contains data representative of the object state of the linear object 150. The linear object key field in the linear object header 152 includes data used to uniquely identify the particular linear object 150 and the linear object data area 156 includes the data of the linear object 150. In the linear object's data area 156, data is stored in a linear or sequentially addressed fashion. Examples of the types of data of a linear object 150 include application code, which is desirable to store in sequential memory addresses to allow for the code to be executed by a processor directly from flash memory.

Figure 5:
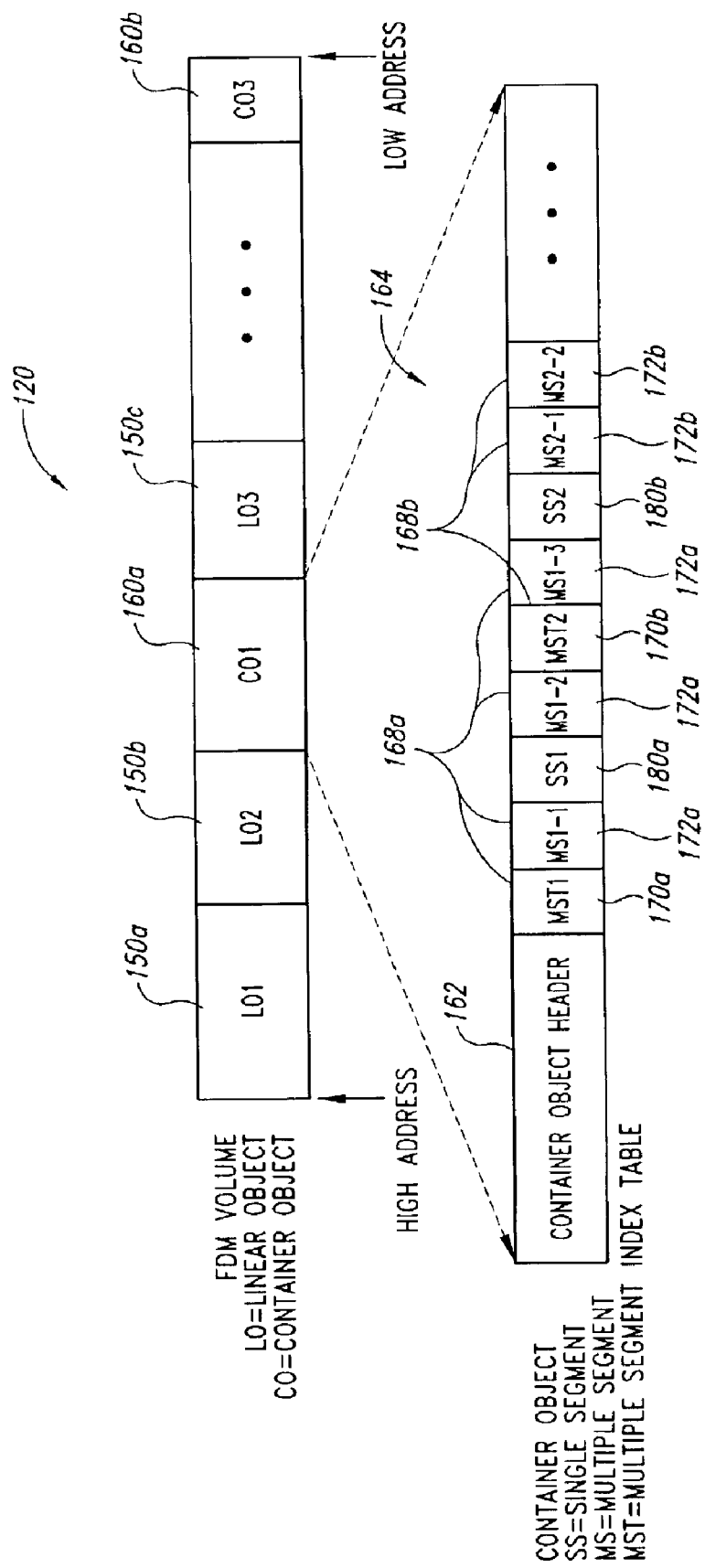
FIG. 5 is a drawing of a container object according to an embodiment of the present invention.

FIG. 5 illustrates the container object 160 according to an embodiment of the present invention. The container object 160 includes a container object header 162 and a container data area 164. As with the linear object headers 152 (FIG. 4), the container object header 162 similarly includes data related to the container object 160. For example, the container object header 162 includes a state field that contains data indicative of object state for the container object 160. In the container data area 164, data objects of a non-linear or non-sequentially addressed nature are stored. As will be explained in more detail below, the type of data objects stored in the data area 164 of the container object 160, that is segment objects, generally represent data that can be stored in non-contiguous segments. The container object 160 is used to store the non-linear data in a linear fashion in the data area 164, thereby enabling linear data (i.e., linear objects 150) and non-linear data (i.e., container objects 160) to be inter-mixed throughout the available memory space of the flash memory device. As illustrated in FIG. 5, the container object 160 can include non-linear objects in the form of multiple segment (MS) data objects 168 and single segment (SS) data objects 180.

Figure 6:
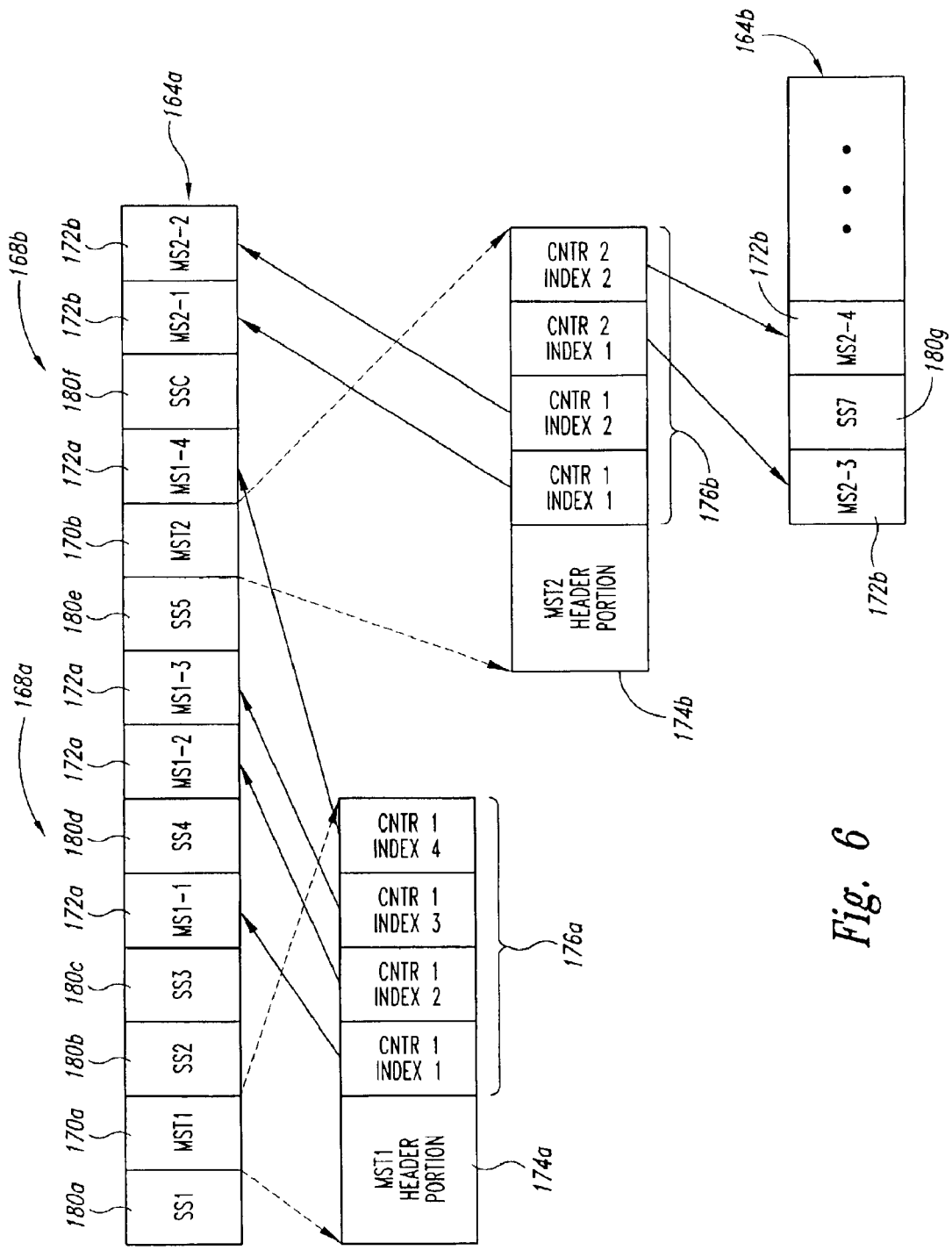
FIG. 6 is a drawing of multiple segment data objects in the container object of FIG. 5 in accordance with an embodiment of the present invention.

As shown in FIG. 6, MS data objects 168 are represented by multiple data segments 172 that are associated with one another to form a relatively large data object in the form of a non-linear object. The structure uses two types of objects: MS data object index tables 170 and data segments 172, which can be stored in the container data area 164a, 164b along with SS data objects 180. The MS data object index tables 170 contain a header portion 174 which defines the state, identity, and other aspects of the MS data object 168, and an index table 176, which contains index entries that identify the data segments 172 comprising the body of the MS data object 168. As shown in FIG. 6, the index entries identify the container and an index entry for each data segment 172. Each data segment 172 has its own header (not shown) which defines its state, identity, and other aspects of that particular data segment.

The MS data object 168 can be embodied in more than one way. In one embodiment, a single MS data object index table 170 can be used for an entire MS data object 168, regardless of the size of the data object. In the MS data object 168, there is no limitation on the number or size of the data segments 172, as these parameters can be set by specifying them in the appropriate fields in the MS data object index tables 170 and data segment headers. A single MS data object index table 170 can potentially become quite large, in some instances, by writing a new MS data object index table 170 after each up date may result in an index table that consumes a large portion of a container object, leaving only a small portion of the container object for storage of data segments or other non-linear objects. Moreover, a large MS data object 168 might result in a large index MS data object index table 170, that potentially could become significant to reallocate and rewrite. A second embodiment allows for multiple MS data object index tables 170 to be used to index the data segments 172 in the MS data object 168. Accordingly, only a shorter MS data object index table 170 might need to be reallocated and/or rewritten as data segments 172 are changed or added. As illustrated, the MS data object index tables 170 may span multiple container objects, thereby avoiding the issue with a single MS data object index table 170 consuming a large portion of a container object. In the second embodiment, a next index table field (not shown) would identify the next MS data object index table 170 used to index the data object. In the first embodiment, the next index table field simply contains a NULL value to signify it is the only MS data object index table. Management of MS data objects 168 is discussed in greater detail in commonly assigned, co-pending U.S. application Ser. No. 10/232,822, entitled MULTIPLE SEGMENT DATA OBJECT MANAGEMENT, to Wong et al., filed Aug. 29, 2002, which is incorporated herein by reference.

Figure 7:
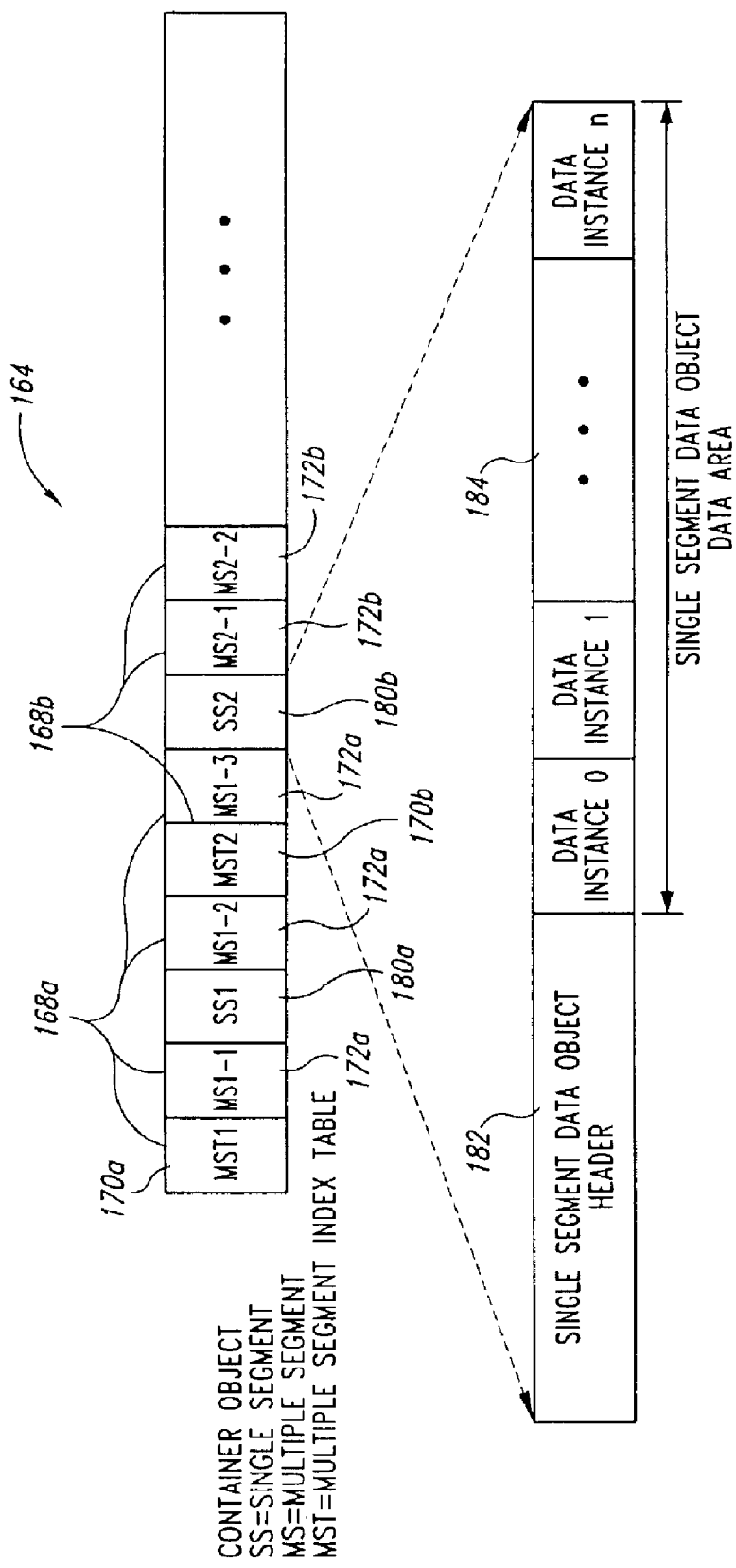
FIG. 7 is a drawing of a single segment data object in the container object of FIG. 5 in accordance with an embodiment of the present invention.

SS data objects 180, on the other hand, are relatively small and have data self-contained in a single segment of the memory space. As shown in FIG. 7, the SS data object 180 includes an SS data object header 182 and an SS data object data area 184. The SS data object header 182 contains various fields. As with the MS data object table header 174 (FIG. 6), the SS data object header 182 includes a state field that contains data representative of an object state of the SS data object 180. The SS data object data area is used to store instances of data having a length less than one read/write unit. A read/write unit is typically the minimum byte size that can be stored in memory and perform flash device input/output operations. The read/write unit is defined by a developer at compile time, and can be used as the default size of a SS data object 180 where the developer does not specifically define the length of the SS data object 180.

However, the SS data object 180 is not restricted to a single read/write unit, and can be of greater length where desirable. For example, where it is anticipated that the data will be updated often, the developer can define the SS data object 180 to be greater than one read/write unit.

Within the SS data object data area, data instances can be updated "in place" by writing new data instances therein and changing the object state of the former data instance to indicate that it has been updated. This avoids the need to define a new data object when updating data with new information. Additionally, the SS data objects 180 allow for variable length updating, that is, updated data having a different length than the previous data instance can be written to available memory within the memory space allocated for an SS data object 180. An example of the type of data represented by an SS data object 180 is phone numbers of a user phone book. Management of SS data objects is discussed in greater detail in commonly assigned, co-pending U.S. application Ser. No. 10/232,840, entitled SINGLE SEGMENT DATA OBJECT MANAGEMENT, to Wong et al., filed Aug. 29, 2002, which is incorporated herein by reference.

It will be appreciated by one of ordinary skill in the art that during a reclamation process, only those MS data objects 168 and SS data objects 180 having a VALID_DATA state will be copied when moving data objects from one list to the opposite list. That is, during reclamation of a container object, only MS data objects 168 and SS data objects 180 having a VALID_DATA state are copied into the new container object. In the event of a power loss, either the new or old container object will be recovered. Consequently, only the valid data objects or the original data objects will be recovered. In this manner, additional memory space can be recovered from within a container object during the reclamation process, further compacting data objects at one end of the volume 120.

As previously described, the linear object 150 (FIG. 4), the container object 160 (FIG. 5), the MS data object 168 (FIG. 6), and the SS data object 180 (FIG. 7) employ a header record that includes a state field. In alternative embodiments of the present invention, alternative fields may be included along with the state field. Some examples of the types of information that can be included in the header of the various data objects are as follows:

ObjectType=type of data object (i.e., linear object, MS data object, SS data object);
Key=unique data object identifier;
HeaderSizeByte=header record size in bytes;
DataSizeByte=Data size in bytes;
TimeStamp=optional timestamp field.

The ObjectType field contains data representing the type of data object. The key field contains data representing a unique identifier that can be used to identify the particular data object. The DataSizeByte field contains data representing the length of the data field of the data object, allowing the memory space of each data object to be variable in length and defined by a developer. An optional TimeStamp field containing data representing the time at which the data object was written can also be included in the header when desired. The HeaderSizeByte field contains data indicative of the length of the header, and is used when additional optional fields are included in the header for some data objects and not for others. For example, where it is desirable for the optional TimeStamp field to be included in the data object header, the value of the HeaderSizeByte field can be specified to accommodate the additional length necessary to include the TimeStamp field. Other data objects not having the optional TimeStamp field will have shorter headers.

It will be appreciated by those of ordinary skill in the art that the particular information included in the header blocks of the data objects may be modified without departing from the scope of the present invention. The previous example has been provided for the purpose of illustration, and alternative fields and information can be included in the header as well. The particular information included in the headers of the data objects will depend on the relevance of that information to the particular type of data object. Moreover, it will also be appreciated that the previous example was provided for the purpose of illustration, and alternative fields and information can be included in the header of the different data objects without departing from the scope of the present invention. Consequently, the foregoing example is not intended to limit the scope of the present invention to any particular embodiment.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. In a memory space, a method for managing data objects in a range of memory having a first end and a second opposite end, the method comprising:
    writing a plurality of data objects to a first contiguous region of memory located at the first end of the range of memory;
    determining validity of the data objects at the first end of the range of memory;
    if at least one data object is determined to be valid, copying the at least one valid data object of the plurality of data objects to a second contiguous region of memory located at the second end of the range of memory and invalidating the at least one valid data object in the first contiguous region of memory previously copied to the second contiguous region of memory subsequent to the at least one valid data object being copied to the second end of the range of memory; and
    erasing the memory in which an invalid data object in the first contiguous region of memory is located.

2. The method of claim 1 wherein the memory space comprises a plurality of blocks of memory and erasing the memory in which the invalid data object is located comprises erasing the blocks of memory in which the invalid data object is located.

3. The method of claim 2, further comprising invalidating all data objects residing in the blocks of memory in which the invalidated data object at the first end is located before erasing the blocks of memory.

4. The method of claim 1 wherein the data objects comprise a header record and a data field, the header record including data representing an object state of the data object, and determining validity of the data objects is based on the object state of the respective data object.

5. The method of claim 4 wherein invalidating the at least one valid data object copied to the second contiguous region of memory comprises updating an object state of a state field included in the header record to an invalid state.

6. The method of claim 4 wherein the data field for at least one of the data objects contains data residing at consecutive memory addresses.

7. The method of claim 4 wherein the data field for at least one of the data objects contains a plurality of non-linear objects.

8. The method of claim 7 wherein the plurality of non-linear objects comprises at least one single-segment data object.

9. The method of claim 7 wherein the plurality of non-linear objects comprises at least one multi-segment data object.

10. The method of claim 1, further comprising writing a new data object contiguously with the data objects at the second end of the range of memory.

11. The method of claim 1 wherein a free memory space is defined as contiguous erased memory in the range of memory between the first contiguous region of memory and the second contiguous region of memory, the method further comprising writing a new data object to one end of the free memory space.

12. The method of claim 1 wherein the memory space comprises non-volatile memory of at least one non-volatile memory device.

13. The method of claim 1 wherein writing a plurality of data objects to a first contiguous region of memory located at the first end of the range of memory comprises:
    writing a first data object abutting the first end of the range of memory;
    writing a second data object to the first contiguous region of memory contiguous with the first data object; and
    writing a third data object to the first contiguous region of memory contiguous with the second data object,
    the method further comprising invalidating the second data object; and
    wherein copying at least one valid data object to the second contiguous region of memory located at the second end and invalidating the valid data objects copied from the first contiguous region of memory to the second contiguous region of memory comprises:
    copying the third data object to the second end of the range of memory;
    invalidating the third data object in the first contiguous region of memory; and
    wherein erasing the memory in which an invalid data object in the first contiguous region of memory is located comprises erasing the memory in which the invalidated second and third data objects are located.

14. The method of claim 1 wherein copying valid data objects to the second contiguous region of memory, invalidating the copied valid data objects in the first contiguous region of memory, and erasing the memory in which invalid data objects in the first contiguous region of memory are located is repeated until sufficient contiguous memory space is reclaimed for allocation to a new data object.

15. A method for managing data objects in a memory space, comprising:
    in the memory space, defining a range of memory having a first end and second opposite end;
    allocating memory contiguously beginning from the first end and extending toward the second end for writing a plurality of data objects to the range of memory;
    determining validity of the data objects at the first end of the range of memory;
    if at least one valid data object of the plurality is detected, allocating memory beginning from the second end and extending toward the first end, copying the at least one valid data object to the allocated memory at the second end, and invalidating the at least one valid data object at the first end of the range of memory; and
    erasing the memory in which an invalid data object at the first end is located.

16. The method of claim 15 wherein the memory space comprises a plurality of blocks of memory and erasing the memory in which an invalid data object at the first end is located comprises erasing the blocks of memory in which the invalid data object at the first end is located.

17. The method of claim 15, further comprising invalidating all data objects residing in the blocks of memory in which the invalid data object at the first end is located before erasing the blocks of memory.

18. The method of claim 15, further comprising writing a new data object to the second end contiguous with the end of the valid data objects.

19. The method of claim 15 wherein the memory space comprises non-volatile memory of at least one non-volatile memory device.

20. The method of claim 15 wherein the data objects comprise a header record and a data field, the header record including data representing an object state of the data object and determining validity of the data objects is based on the object state of the respective data object.

21. The method of claim 20 wherein invalidating the valid data objects copied to the allocated memory at the second end comprises updating an object state of a state field included in the header record to an invalid state.

22. The method of claim 20 wherein the data field for at least one of the data objects contains data residing at consecutive memory addresses.

23. The method of claim 20 wherein the data field for at least one of the data objects contains a plurality of non-linear objects.

24. The method of claim 23 wherein the plurality of non-linear objects comprises at least one single-segment data object.

25. The method of claim 23 wherein the plurality of non-linear objects comprises at least one multi-segment data object.

26. The method of claim 15 wherein copying valid data objects to the allocated memory at the second end, invalidating the copied valid data objects in the allocated memory in the first end, and erasing the memory in which invalid data objects are located is repeated until sufficient contiguous memory space is reclaimed for allocation to a new data object.

27. A method of managing data objects in a contiguous range of memory defined by a starting memory address and ending memory address, the contiguous range of memory having sequential memory addresses between the starting memory address and the ending memory address, the method comprising:
  writing a plurality of data objects to a first list of contiguous memory starting from the starting memory address and extending toward the ending memory address;
  determining validity of the data objects in the first list;
  if at least one data object of the plurality is determined to be valid, copying the at least one valid data object of the plurality to a second list of contiguous memory starting from the ending memory address and extending toward the starting memory address and invalidating the at least one valid data object in the first list; and
  erasing the memory in which an invalid data object in the first list is located.

28. The method of claim 27 wherein the sequential memory addresses ascend from the starting memory address to the ending memory address.

29. The method of claim 27 wherein the sequential memory addresses descend from the starting memory address to the ending memory address.

30. The method of claim 27 wherein the contiguous range of memory is located in a memory having a plurality of blocks of memory and erasing the invalid data object comprises erasing the blocks of memory in which the invalid data object in the first list is located.

31. The method of claim 30, further comprising invalidating all data objects residing in the blocks of memory in which the invalid data object is located before erasing the blocks of memory.

32. The method of claim 27 wherein the data objects comprise a header record and a data field, the header record including data representing an object state of the data object and invalidating the at least one valid data object in the first list comprises updating an object state of a state field included in the header record to an invalid state.

33. The method of claim 27 wherein at least one of the plurality of data objects comprises a linear object containing data stored in a sequentially addressed range of memory.

34. The method of claim 27 wherein at least one of the plurality of data objects comprises a data object having a data field including a plurality of non-linear objects.

35. The method of claim 34 wherein the plurality of non-linear objects comprises at least one single-segment data object.

36. The method of claim 34 wherein the plurality of non-linear objects comprises at least one multi-segment data object.

37. The method of claim 27 wherein the contiguous range of memory comprises non-volatile memory of at least one non-volatile memory device.

38. The method of claim 27 wherein writing a plurality of data objects to the first list comprises:
  writing a first data object to the first list starting at the starting memory address;
  writing a second data object to the first list contiguous with the first data object; and
  writing a third data object to the first list contiguous with the second data object,
  the method further comprising invalidating the second data object; and
  wherein copying valid data objects to the second list and invalidating the data objects copied from the first list comprises:
  copying the third data object to the second list;
  invalidating the third data object from the first list; and
  wherein erasing the memory in which an invalid data object in the first list is located comprises erasing the memory in which the invalidated second and third data objects are located in the first list.

39. The method of claim 38, further comprising allocating memory contiguous to the third data object in the second list and writing a fourth data object to the allocated memory.

40. A method of managing data objects in a contiguous range of memory defined by a starting memory address and ending memory address, the contiguous range of memory having sequential memory addresses between the starting memory address and the ending memory address, the method comprising:
  allocating memory contiguously starting at the starting memory address and extending toward the ending memory address for a plurality of data objects written to the range of memory;
  determining validity of the data objects written to the range of memory;
  if at least one data object of the plurality is determined to be valid, allocating contiguous memory in the range of memory starting from the ending memory address and extending toward the starting memory address, copying the at least one valid data object to the allocated memory, and invalidating the at least one valid data object in the range of memory starting at the starting memory address and extending toward the ending memory address; and erasing the memory in which an invalid data object in the range of memory starting at the starting memory address and extending toward the ending memory address is located.

41. The method of claim 40 wherein the sequential memory addresses ascend from the starting memory address to the ending memory address.

42. The method of claim 40 wherein the sequential memory addresses descend from the starting memory address to the ending memory address.

43. The method of claim 40 wherein the contiguous range of memory is located in a memory space having a plurality of blocks of memory and erasing the invalidated data object comprises erasing the blocks of memory in which the invalidated data object is located.

44. The method of claim 43, further comprising invalidating all data objects residing in the blocks of memory in which the invalid data object is located before erasing the blocks of memory.

45. The method of claim 40 wherein the contiguous range of memory comprises non-volatile memory of at least one non-volatile memory device.

46. The method of claim 40 wherein the data objects comprise a header record and a data field, the header record including data representing an object state of the data object and determining validity of the data objects based on the object state of the respective data object.

47. The method of claim 46, further comprising updating an object state of a state field included in the header record of the at least one valid data object in the contiguous range of memory starting at the starting memory address to an invalid state.

48. The method of claim 46 wherein the data field for at least one of the data objects contains data residing at consecutive memory addresses.

49. The method of claim 46 wherein the data field for at least one of the data objects contains a plurality of non-linear objects.

50. The method of claim 49 wherein the plurality of non-linear objects comprises at least one single-segment data object.

51. The method of claim 49 wherein the plurality of non-linear objects comprises at least one multi-segment data object.

52. The method of claim 40 wherein allocating contiguous memory starting from the ending memory address, copying the valid data objects to the allocated memory, invalidating valid data objects, and erasing the memory in which invalid data objects are located is repeated until sufficient contiguous memory space is reclaimed for allocation to a data object.

53. The method of claim 40 wherein invalidating the valid data objects from the first list comprises invalidating each valid data object from the range of memory starting at the starting memory address after copying of that valid data object to the range of memory starting from the ending memory address is completed and before copying another valid data object to the range of memory starting from the ending memory address commences.

54. A computer-readable medium having computer-executable instructions for performing steps of managing data objects in a contiguous range of memory defined by a starting memory address and ending memory address, the contiguous range of memory having sequential memory addresses between the starting memory address and the ending memory address, the steps comprising:

writing a plurality of data objects to a first list of contiguous memory starting from the starting memory address and extending toward the ending memory address;

determining validity of the data objects in the first list;

if at least one data object of the plurality is determined to be valid, copying the at least one valid data object of the plurality to a second list of contiguous memory starting from the ending memory address and extending toward the starting memory address and invalidating the at least one valid data object in the first list; and erasing the memory in which an invalid data object in the first list is located.

55. The computer-readable medium of claim 54 wherein the sequential memory addresses ascend from the starting memory address to the ending memory address.

56. The computer-readable medium of claim 54 wherein the sequential memory addresses descend from the starting memory address to the ending memory address.

57. The computer-readable medium of claim 54 wherein the contiguous range of memory comprises a plurality of blocks of memory and erasing the memory in which the invalid data object is located comprises erasing the blocks of memory in which the invalidated data object in the first list is located.

58. The computer-readable medium of claim 57, further comprising computer executable instructions for invalidating all data objects residing in the block of memory in which the invalidated data object is located before erasing the blocks of memory.

59. The computer-readable medium of claim 54 wherein the data objects comprise a header record and a data field, the header record including data representing an object state of the data object and invalidating the at least one valid data object in the first list comprises updating an object state of a state field included in the header record to an invalid state.

60. The computer-readable medium of claim 54 wherein at least one of the plurality of data objects comprises a linear object containing data residing at consecutive memory addresses.

61. The computer-readable medium of claim 54 wherein at least one of the plurality of data objects comprises a data object having a data field including a plurality of non-linear objects.

62. The computer-readable medium of claim 61 wherein the plurality of non-linear objects comprises at least one single-segment data object.

63. The computer-readable medium of claim 61 wherein the plurality of non-linear objects comprises at least one multi-segment data object.

64. The computer-readable medium of claim 54 wherein the contiguous range of memory comprises non-volatile memory of at least one non-volatile memory device.

65. The computer-readable medium of claim 54 wherein writing a plurality of data objects to the first list comprises:

writing a first data object to the first list starting at the starting memory address;

writing a second data object to the first list contiguous with the first data object; and writing a third data object to the first list contiguous with the second data object, the method further comprising invalidating the second data object; and wherein copying valid data objects to the second list and invalidating the data objects copied from the first list comprises:

copying the third data object to the second list;

invalidating the third data object from the first list; and wherein erasing the memory in which an invalid data object in the first list is located comprises erasing the memory in which the invalidated second and third data objects are located.

66. The method of claim 65, further comprising allocating memory contiguous to the third data object in the second list and writing a fourth data object to the allocated memory.

67. A computer-readable medium having computer-executable components for managing data objects in a contiguous range of memory defined by a starting memory address and ending memory address, the contiguous range of memory having sequential memory addresses between the starting memory address and the ending memory address, the computer-executable components comprising:

a memory allocation component for allocating memory contiguously starting at the starting memory address and extending toward the ending memory address for a plurality of data objects written to the range of memory;

a data object validity component for determining validity of the data objects written to the range of memory;

a data object copying component for copying, when at least one data object of the plurality is determined to be valid, the at least one valid data object to contiguous memory of the range of memory starting from the ending memory address and extending toward the starting memory address;

a data object invalidating component for invalidating the copied valid data object in the contiguous memory starting from the starting memory address and extending toward the ending memory address each time copying of the valid data object to the contiguous memory starting from the ending memory address is completed; and a data object erasing component for erasing the memory in which invalid data objects are located.

68. The computer-readable medium of claim 67 wherein the sequential memory addresses ascend from the starting memory address to the ending memory address.

69. The computer-readable medium of claim 67 wherein the sequential memory addresses descend from the starting memory address to the ending memory address.

70. The computer-readable medium of claim 67 wherein the contiguous range of memory is located in a memory space having a plurality of blocks of memory and the data object erasing component erases the memory in which the invalidated data object is located by erasing the blocks of memory in which the invalidated data object is located.

71. The computer-readable medium of claim 70 wherein the data object invalidating component invalidates all data objects residing in the blocks of memory in which the invalidated data object is located before the data object erasing component erases the blocks of memory.

72. The computer-readable medium of claim 67 wherein the contiguous range of memory comprises non-volatile memory of at least one non-volatile memory device.

73. The computer-readable medium of claim 67 wherein the data objects comprise a header record and a data field, the header record including data representing an object state of the data object and the data object validity component determines validity of the data objects based on the object state of the respective data object.

74. The computer-readable medium of claim 73 wherein the data object invalidating component invalidates the copied valid data object by updating an object state of a state field included in the header record of the at least one valid data object in the contiguous range of memory starting at the starting memory address to an invalid state.

75. The computer-readable medium of claim 73 wherein the data field for at least one of the data objects contains data residing in consecutive memory addresses.

76. The computer-readable medium of claim 73 wherein the data field for at least one of the data objects contains a plurality of non-linear objects.

77. The computer-readable medium of claim 76 wherein the plurality of non-linear objects comprises at least one single-segment data object.

78. The computer-readable medium of claim 76 wherein the plurality of non-linear objects comprises at least one multi-segment data object.

79. The computer-readable medium of claim 67 wherein allocating contiguous memory starting from the ending memory address by the memory allocation component, copying the valid data objects to the allocated memory by the data object copying component, invalidating the data objects by the data object invalidating component, and erasing the memory in which invalid data objects are located by the data object erasing component is repeated until sufficient contiguous memory space is reclaimed for allocation to a data object.

80. The computer-readable medium of claim 67 wherein the data object invalidating component invalidates a data object in the first list after the data object copying component copies the valid data object to the second list and before the data object copying component copies another valid data object to the second list.

* * * * *